W. W. HOPKINS.
CALCULATING MACHINE.
APPLICATION FILED OCT. 5, 1907.

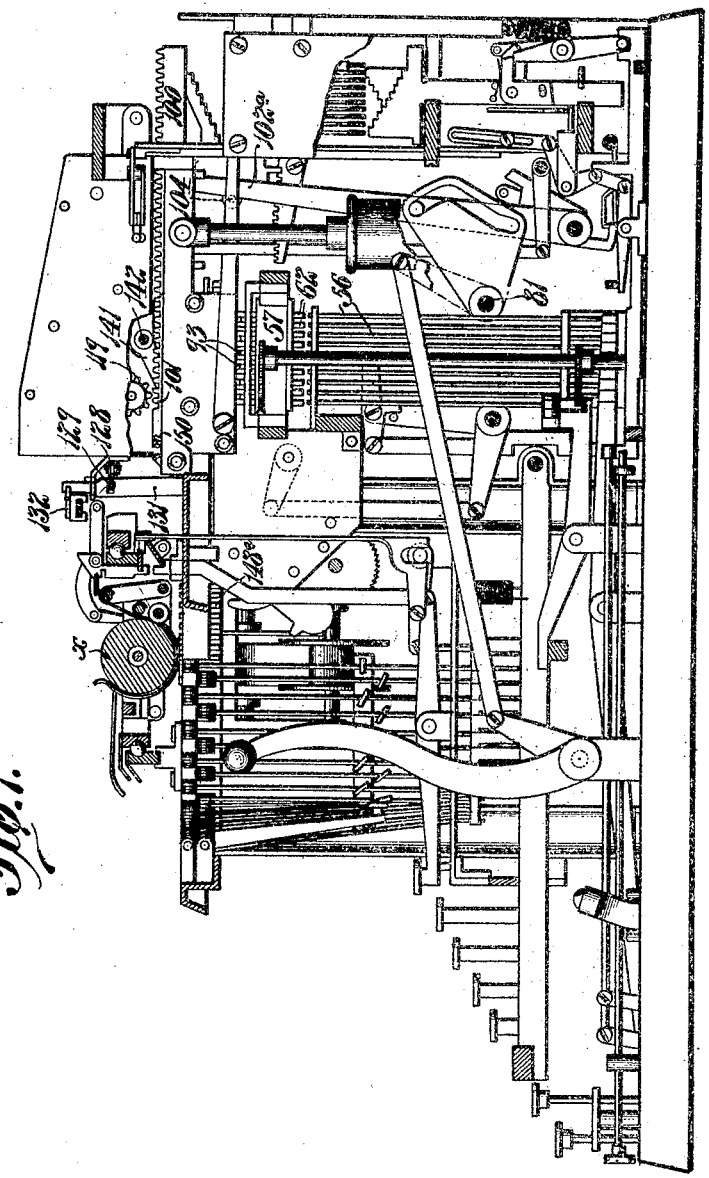

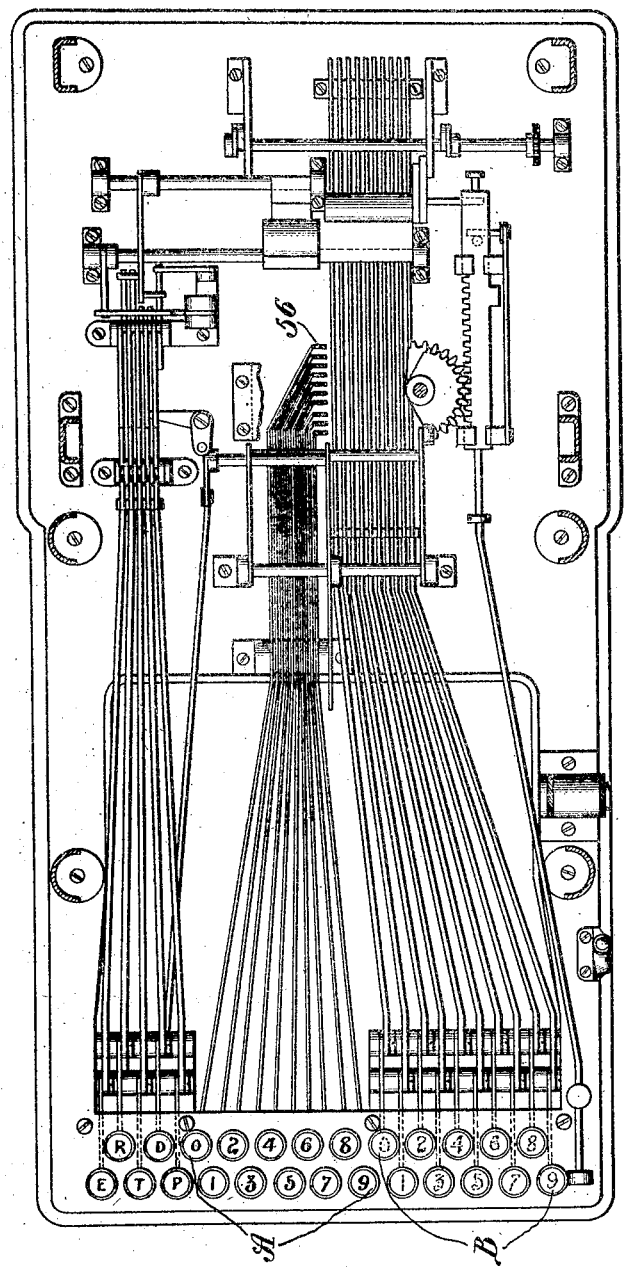

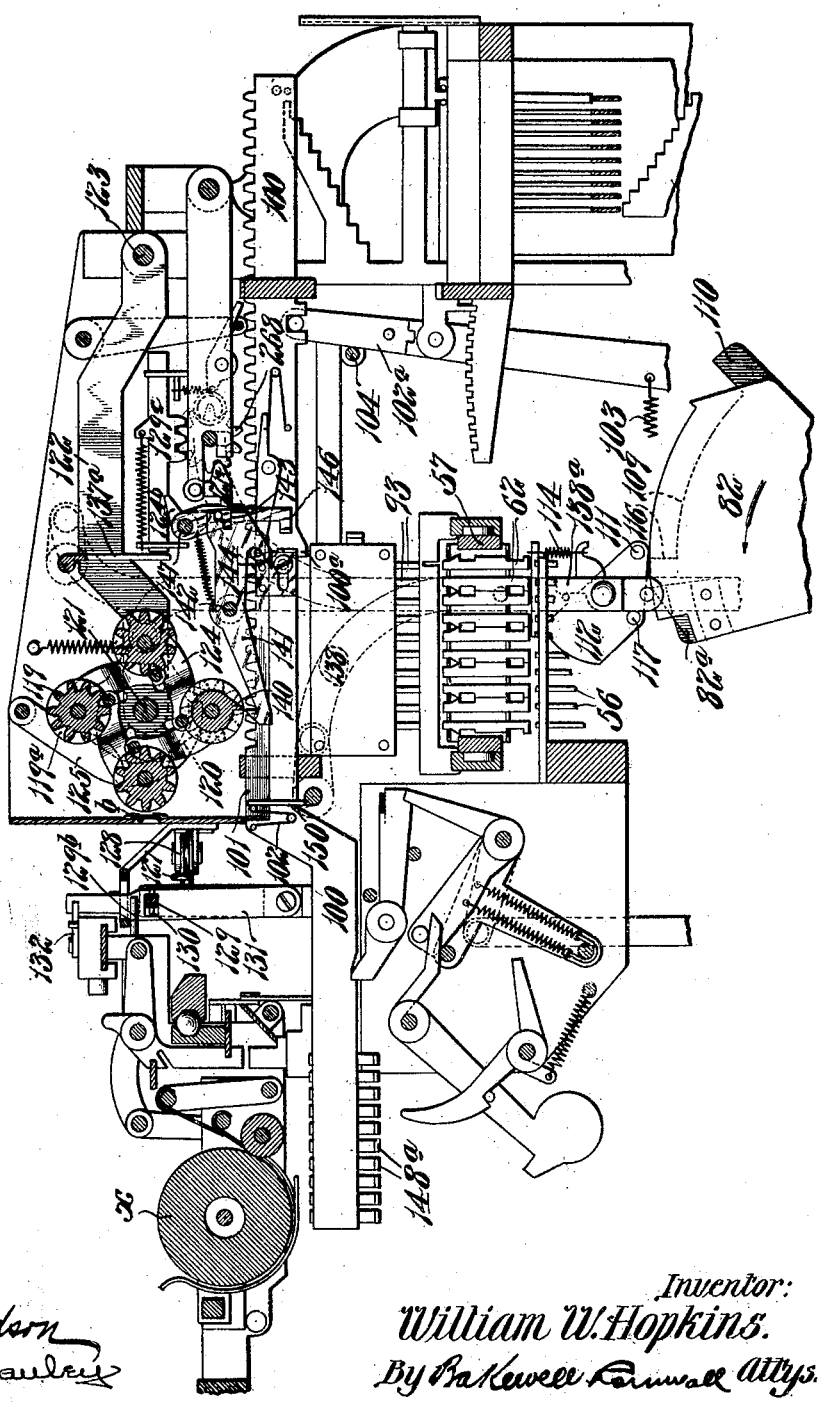

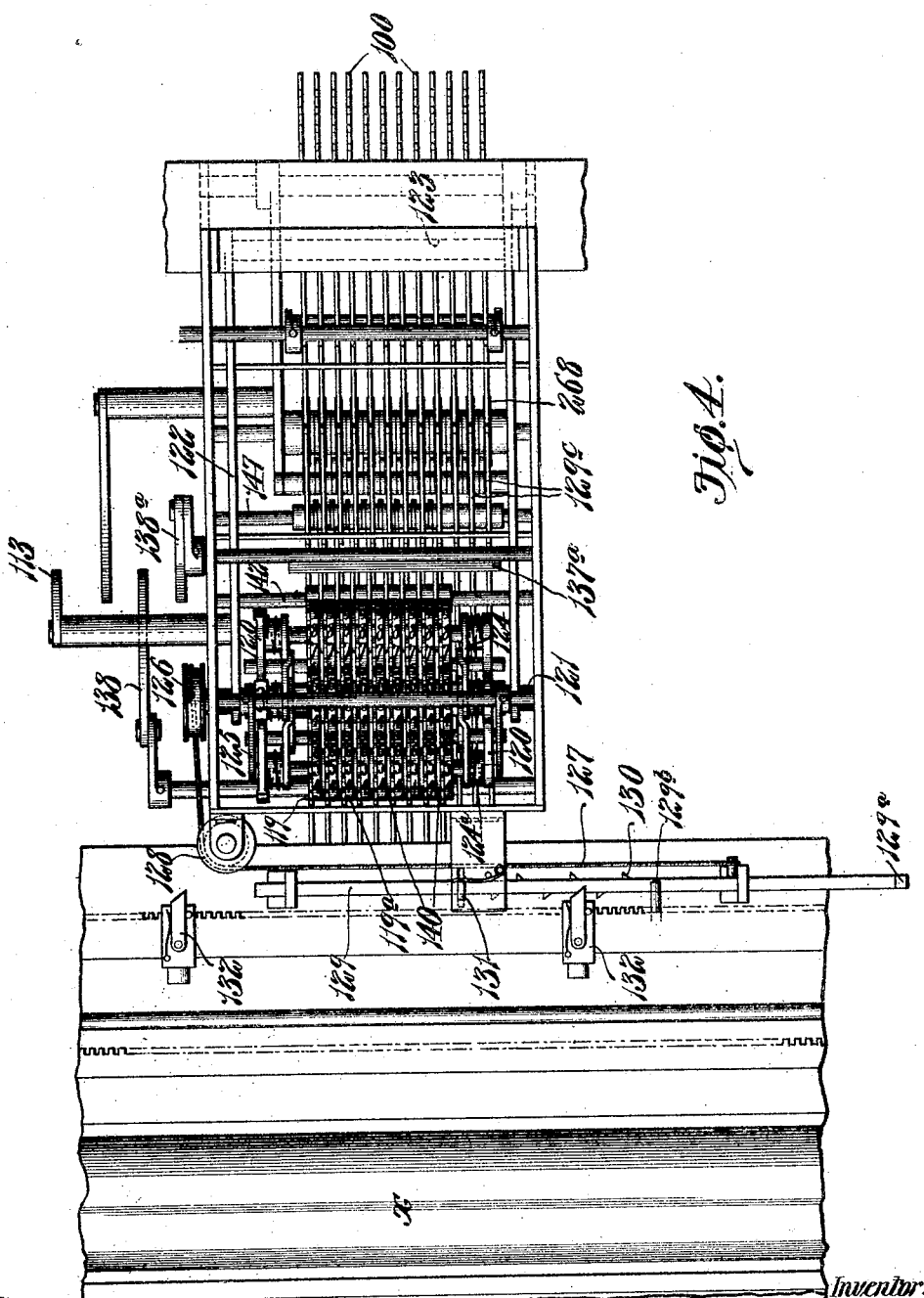

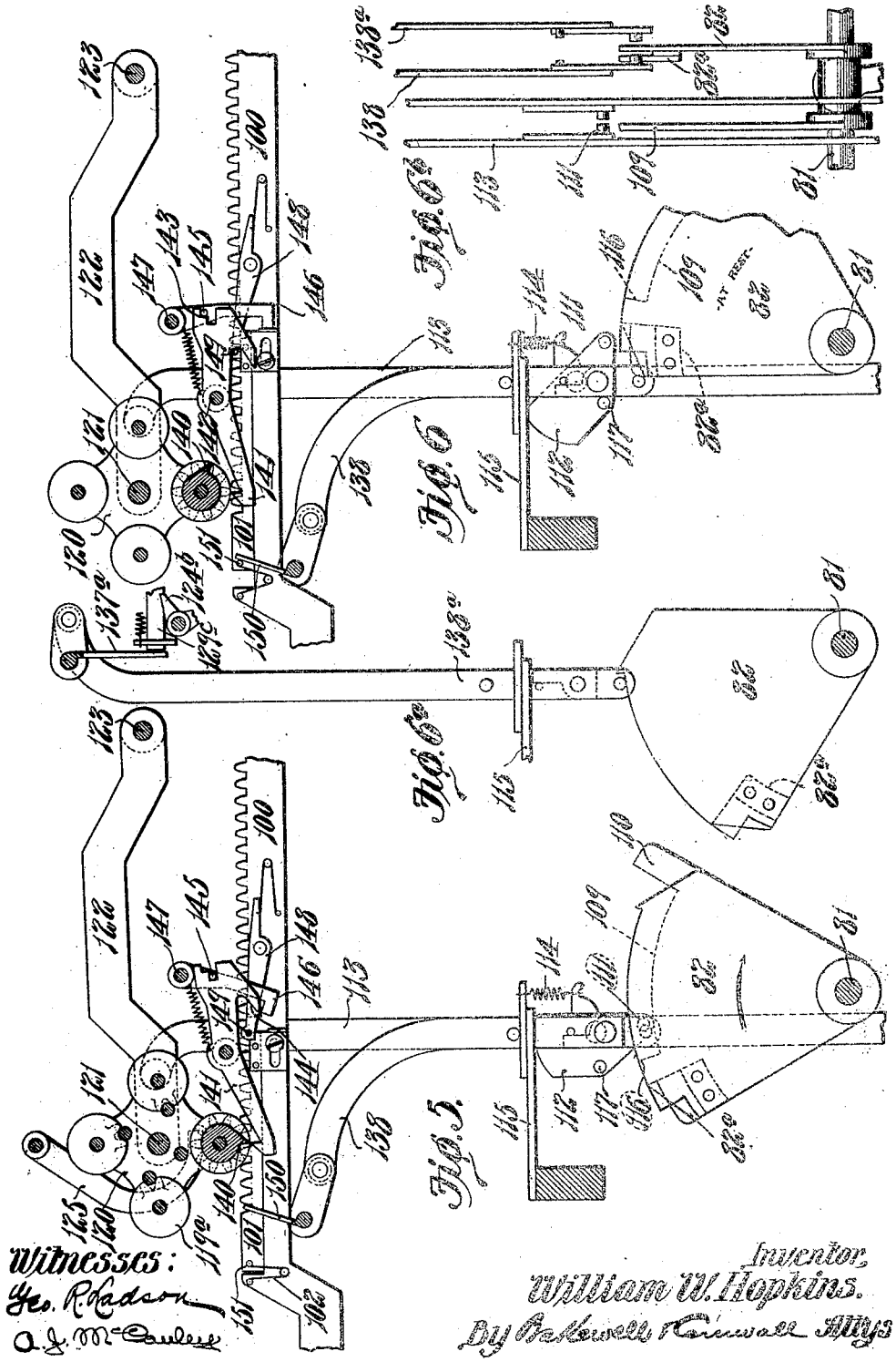

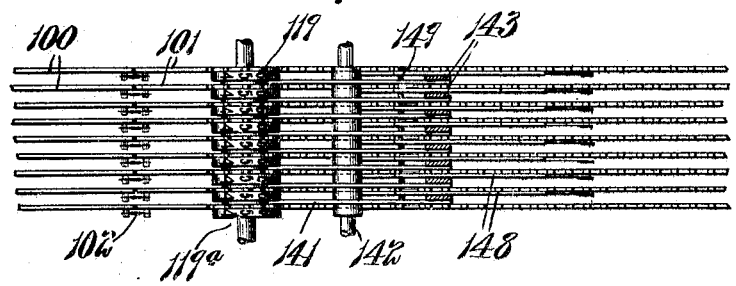
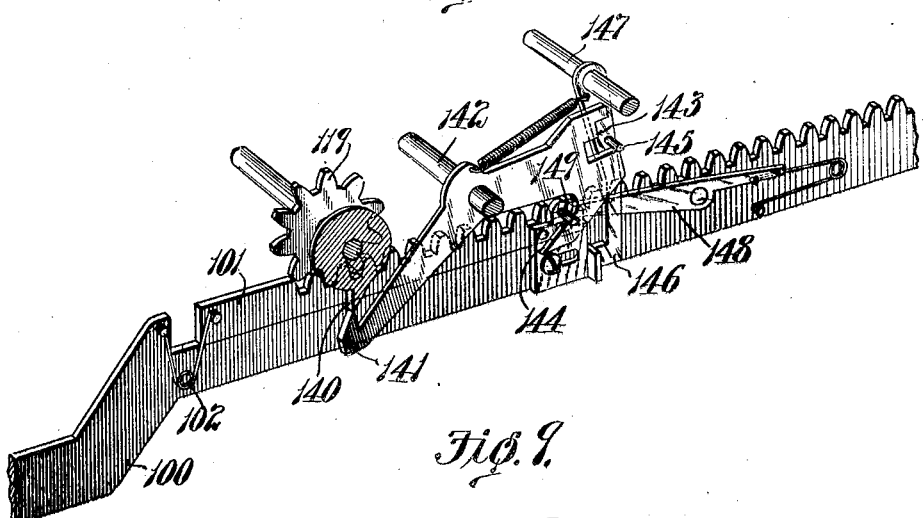
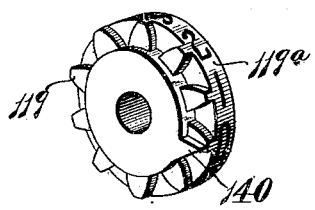

1,367,877.

Patented Feb. 8, 1921.
7 SHEETS—SHEET 7.

Witnesses:

Inventor:
William W. Hopkins.
By Bakewell Cornwell Attys.

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,367,877.        Specification of Letters Patent.        Patented Feb. 8, 1921.

Application filed October 5, 1907. Serial No. 396,032.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a vertical longitudinal view through the entire machine;

Fig. 2 is a horizontal sectional view showing the keys and key connections of the adding department of the machine;

Fig. 3 is an enlarged vertical sectional view through my improved machine;

Fig. 4 is a top plan view of a portion thereof;

Fig. 5 is a detail side elevational view showing the parts in their carrying position;

Fig. 6 is a similar view showing the parts in a different position;

Figure 10:
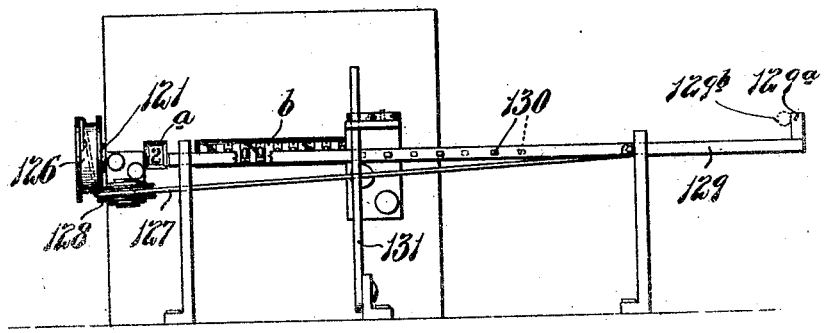
Figure 11:
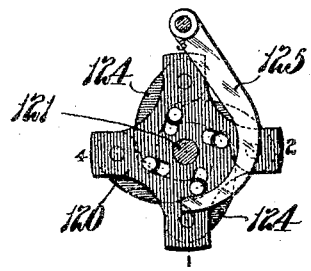
Figure 12:
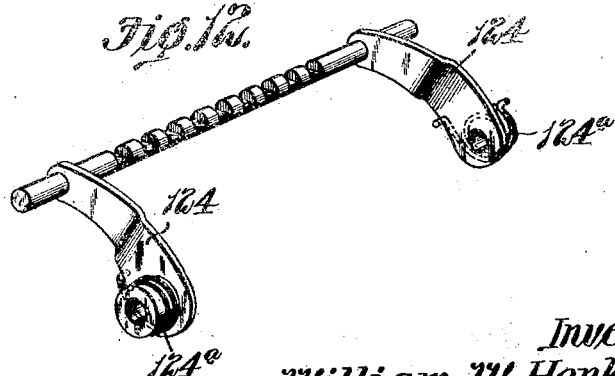

Fig. 6ª is a detail view showing the means for operating the rear totalizer carrier bars;

Fig. 6ᵇ is a front elevational view of the cam plates and their coöperating bars;

Fig. 7 is a top plan view of the racks and their associate carrying mechanism;

Fig. 8 is a detail view of a portion of the carrying mechanism;

Fig. 9 is a detail view of one of the register indicator wheels;

Fig. 10 is a detail view of the escapement mechanism which controls the position of the totalizers;

Fig. 11 is a detail view showing the means for releasing the engaged totalizers; and Fig. 12 is a detail view of one of the locking bars which coöperate with the totalizers.

This invention relates to a new and useful improvement in calculating machines of that type wherein a number of totalizers are mounted in a cylinder, one of said totalizers only being adapted to be operated by the actuating devices at a time when the other totalizers are revolved out of operative position. There is another totalizer separate and distinct from those carried by the reel or cylinder, and this other totalizer is operable independently of the plurality of revolving totalizers so that in the operation of the machine this independent totalizer may be used in additive operations as a totalizer primary in character, or said independent totalizer may be used as a product totalizer in conjunction with the multiplying devices of the machine. By providing a calculating machine with groups of totalizers operating as separate entities, to wit, the revolving totalizers mounted on the reel or cylinder, and also providing the calculating machine with an independent totalizer, it is possible to add separate columns of figures in the independent totalizer and in each of the groups of revoluble totalizers, so that footings may be printed at the bottom of the different columns. It is also possible to add separate columns of figures in the revoluble totalizers, and at the time of printing the totals of the separate columns to introduce said totals into the independent totalizer to obtain a grand total of all the columns. It is also possible to perform operations of lineal addition, printing the total of the series of alined figures at the end of the line, and then adding all of the separate totalizers together print the grand total thereof.

The machine is also capable of performing the operation of vertical column addition at the same time that it performs the operation of cross-line or lineal addition so that cross-line totals may be printed at the end of the line and the column totals at the foot of the column, the grand total being printed so as to prove the correctness of both systems of addition.

There are many other arithmetical computations that can be performed on the machine shown in the accompanying drawings, but I deem it unnecessary to explain these fully here because they are specifically referred to in an application filed by Hubert Hopkins April 9, 1906, Serial No. 310,739. My present invention is an improvement upon the machine shown in the said Hubert Hopkins's application, and may be said briefly to consist principally in the revoluble totalizers and the carrying mechanism coöperating therewith. I shall not, therefore, enter into a detail description of the various parts of the machine disclosed in said Hubert Hopkins's application except to show the relation of such parts to my present improvement.

In the calculating machine shown in the accompanying drawings the operation of introducing examples into the machine is performed by pressing the proper digit keys in group A (see Fig. 2) which, through the bars 56, raise the stops 62 in a traveling carriage 57, after which, when the power shaft 81 is operated, intermediate stop pins 93 are raised in front of projections 100ᵃ on the rack bars 100, and as the rack bars move forward they are arrested in one of nine different positions by said stop pins 93. One of the totalizers or registers mounted in the reel in operative relation to the racks, is thrown into engagement with the racks when the racks are in their forward position, after which the restoring bar 104 picks up the rocking levers 102ᵃ having slot and pin connections with the racks, and restores the racks to their normal position, and by so doing introduces the item into the register wheels. The rocking levers 102ᵃ constituting the operating mechanism for the racks, are connected to springs 103 which tend to pull them forward.

To obtain a total an appropriate key (marked T in Fig. 2) is depressed, which causes the register wheels in operative relation to the racks to engage with the racks before the racks start on their forward movement, and consequently the register wheels, if not standing at zero, will be reversely rotated until the printing type carried by the forward end of the rack exhibit the total of the amount registered.

A product register represented by the wheels 268 also coöperates with the racks 100, and if desired instead of introducing an example into one of the groups of register wheels mounted on the reel, the D key may be pressed and the example introduced directly into the wheels 268.

To obtain the product or total indicated on the register wheels 268 the P key is depressed and the power shaft of the machine operated. In such total-taking operation the number registered in the wheels 268 is cleared therefrom and introduced into one of the forward totals.

The operation of multiplication is performed by setting up the multiplicand through the medium of the keys in group A and pressing R key, which results in setting up the example both in one of the forward totalizers and in the multiplying devices. The multiplicand if already set up in one of the forward totalizers may be transferred through the medium of the racks 100 by pressing the E key and operating said racks. The digits of the multiplier are separately set up by pressing the keys in group B. When a key in group B is depressed the power shaft must be operated twice, except for the zero character, for the purpose of obtaining tens and units partial products which are introduced in the register wheels 268 and there added together to form a complete product. When a complete product is obtained the P key may be depressed and the product recorded and at the same time registered in one of the forward totalizers. Suitable carrying mechanism is provided for the forward totalizer wheels and the wheels 268, and if desired, the several groups of forward totalizer wheels may be engaged with the racks 100 at different times whereby separate totals or totals of different articles or things may be carried in the machine at the same time.

The rack bars carry printing type 148ᵃ by which the items and the total thereof introduced into the adding register or totalizer may be recorded, and when a complete product is obtained said product may be recorded.

The paper on which the printing record is made coöperates with the platen X arranged in the carriage at the top of the machine, which carriage is movable across the machine. Typewriting mechanism is also used to print words and characters on the paper in the carriage in line with the type impressions derived from the type carried by the rack bars of the calculating machine.

I do not deem it necessary for purposes of this application to describe the details of construction and various operations of the several parts constituting the calculating machine forming the subject-matter of the application aforesaid, as the same forms no part of this present invention.

Referring to Fig. 3 it will be seen that the forward totalizers are four in number but it is obvious that this number could be changed. These totalizers are composed of suitable wheels 119 loosely mounted on their respective shafts, and are carried by end plates 120. The end plates, as shown in Figs. 5 and 6, are fixed on a shaft 121 journaled in the free end of a frame 122 pivotally mounted on a shaft 123.

Means are provided for swinging the frame 122 and its carried totalizers so that the selected totalizer may be thrown into and out of mesh with the racks. These means are shown in Figs. 5 and 6. Fixed on the shaft 81 is a rocking plate 109 which is vibrated at each operation of the operating handle. The rear end of this plate is provided with a shoulder 110, which when the plate is nearing the limit of its forward movement comes in contact with a pin 111 carried by a tappet 112, mounted on a bar 113 normally held in a raised position by a spring 114. 115 is a plate fixed to the framing of the machine and against which the upper cam edge of the tappet 112 rests. When the shoulder 110 strikes the pin 111 the tappet is rocked on its fulcrum on the bar 113, forcing the bar 113 downwardly and positioning the tappet as shown in Fig. 5, in which position the plate 109 is nearing its home position, at which time a shoulder 116 engages the pin 111 and forces the tappet to assume its normal position. The cam face of the tappet is such that in being restored by the shoulder 116, the action of the spring 114 in lifting the bar will cause the tappet to move until a stop pin 117 carried thereby engages with the front edge of the bar 113, in which (normal) position of the tappet pin 111 is lifted above the shoulder 116. The plate 109 is cut away in front of the projection forming the shoulder 116 so as to permit the depression of the bar 113 without interference from the plate 109, as for instance, in the taking of a total.

After an example has been set up in the machine the forward movement of the operating handle will cause the stop pins 93 to be positioned, which stop pins control the forward movement of the rack bars. The rack bars move forwardly under the impelling action of the springs 103 until arrested by the pins 93. Then the cam plate 109 causes one of the forward totalizers to be engaged with the rack bars and when the handle is moved rearwardly the bar 104 restores the rack bars and actuates the totalizer wheels, introducing the item thereinto.

As the handle approaches the final limit of its rearward movement the shoulder 116 engages the pin 111, permitting the spring 114 to lift the totalizer frame 122 and raise said totalizer wheels out of engagement with the rack bars.

To lock the totalizer wheels against accidental displacement when not in engagement with the racks, I mount bails 124 in the head plates 120 (see Figs. 11 and 12) the cross bars of which bails are held in engagement with their respective totalizer wheels by means of springs 124$^a$. For simplicity of construction each bail is mounted on the shaft of a totalizer and coöperates with the gear wheels of an adjacent totalizer. The ends of the cross bars of the bails pass through slots in the head plates 120 and coöperate with lifting bars 125 mounted on the side inclosing plates of the machine. The lifting bars 125 being stationarily mounted and appropriately shaped so as to engage only the projecting ends of the cross bars coöperating with the lowermost totalizer wheels, will, when the frame 122 is depressed, lift the bail in engagement with said lowermost idler at the time that said wheels are being moved to mesh with their actuating racks.

To revolve the totalizers and bring them successively into mesh with their actuating racks I arrange a spring drum 126 on the end of shaft 121, which spring drum tends at all times to rotate the shaft 121 in one direction. To rotate shaft 121 in the opposite direction I arrange a cable 127 on said spring drum, said cable passing over an idle sheave 128 and being connected to a bar 129 having escapement teeth 130 (see Figs. 3, 4 and 10). 131 is a pivoted rocking plate which coöperates with the escapement teeth 130 and this plate 131 is vibrated by tappets 132 mounted on the frame of the laterally movable paper carriage. These tappets are preferably mounted on adjustable blocks so that they may coöperate with the plate 131 in different positions of the paper carriage. If it is desired to print separate columns on a sheet of paper and separately add the items of the different columns it is obvious that when the laterally movable paper carriage is positioned for the respective columns that the plate 131 will be vibrated, which vibration permits the spring in drum 126 to revolve the totalizers and present the appropriate totalizer in operative relation to the actuating racks for each separate column. The escapement bar 129 is provided with a shoulder or projection 129$^a$, which coöperates with the fixed stop 129$^b$ on the paper carriage whereby whenever the paper carriage is moved from left to right the totalizers are revolved to their normal or starting positions. In Fig. 11 the totalizers have been marked 1, 2, 3 and 4 and if we assume that the machine is normal when totalizer 1 is in operative relation to the racks it is obvious that after the paper carriage is moved toward the left so that numbers may be printed in the second column, that the first tappet 132 will operate the escapement mechanism and bring totalizer number 2 in operative relation to the racks. The steps in the partial revolutions of the totalizers continue until totalizer number 4 is brought in position to register the number recorded in the fourth column. When the carriage is restored to its normal position at the right the totalizers will be revolved so as to bring totalizer number 1 in operative position to the actuating racks.

The numbers printed in the four columns in horizontal alinement can be added together in the rear totalizer so as to enable the operator to print a line total at the end of each horizontal line. The rear totalizer would, of course, stand clear after printing the total as a result of this lineal addition. After the four columns of numbers have been printed the separate totals of the columns may be printed as footings thereof, the T key being depressed for this purpose. If it is desired to obtain a grand total, or the sum of the four totals, the D key is depressed in conjunction with the T key which registers the four separate totals as items in the rear totalizer. The rear totalizer can then be made to yield its grand total by pressing the P key and this grand total must agree with the sum of all of the totals resulting from the lineal additions. If it is desired to obtain a grand total of the lineal additions one of the forward totalizers can be used for this purpose to register the lineal totals as they are printed from the rear totalizer to clear the rear totalizer for a new line. This latter operation will, of course, reduce the capacity of the machine one column and the operator will be enabled to print only three separate columns, the fourth forward totalizer being used to accumulate the lineal totals.

By referring to Figs. 4 and 10 it will be seen that one of the head plates for the revolving totalizers is provided with numbers which come opposite an opening $a$ through which they may be seen, thus indicating which totalizer is in operative relation to the actuating racks.

Conjoined to the wheels 119 are numbered rims 119$^a$ (see Fig. 9), which rims are visible through a sight opening $b$ (see Fig. 10), so that there is a visual indication of the number registered in each totalizer as the totalizers are revolved and presented opposite this sight opening.

Each of the wheels 119 is provided with a tripping projection 140, which tripping projection is used in connection with the carrying mechanism.

Referring to Fig. 8 it will be seen that the tripping projection 140 coöperates with a tripping pawl 141 mounted on a shaft 142, and having a stepped portion 143 and an inclined cam face 144. The stepped portion 143 coöperates with a pin 145 carried by a depending tappet 146 mounted on a rod 147. The normal position of this tappet is shown in Fig. 6 but whenever the tripping pawl 141 is operated the pin 145 permits the tappet 146 to move to an abnormal position, shown in Fig. 5.

The rack 100 is provided with a movable section 101 which movable section coöperates with the forward totalizers. Normally these racks occupy a position one tooth to the rear of their abnormal or carrying position. Springs 102 tend to move the racks 101 the distance of one tooth, but the racks are restrained from movement by means of a dog 148, pivotally mounted on the rack 100 to the rear thereof. This dog 148 is provided with a pin 149 which coöperates with the cam face 144 and the tripping pawl. The operation of the carrying mechanism is as follows:

The racks in order to actuate the register wheels in introducing items therein must be in other than a home position; thus, no matter whether a rack is moved to its first or to its ninth position from home, the pin 149 would be moved out of engagement with its coöperating cam face 144. The dog 148 holds the movable rack 101 against the tension of the spring 102 one tooth behind with respect to the advancing movement of the register wheel. If the tripping pawl 141 should now be operated, the tappet 143 would be released and permitted to move forward so that the tripping pawl would be held in its tripped position. When the restoring bar 104 moves rearwardly to introduce the item into the register wheels, one or more of the tripping pawls 141 may be operated, and then as the pins 149 come in engagement with the cam faces 144 moved upwardly into their paths, the restraining dogs 148 will be lifted so as to release the racks 101 and permit their rearward movement one tooth, which movement is an advancing movement with respect to the register wheel in mesh with the released rack 101. It is of course obvious that the tripping projection 140 is on the left hand side of the register wheel, as shown in Fig. 9, and trips the pawl 141 indentified with the individual carrying mechanism of the next adjacent rack of higher order, so that whenever a register wheel registers more than nine one will be carried to the next adjacent register wheel at the left.

To restore the movable racks 101 to normal position I provide a comb plate 150 which coöperates with pins 151 on said movable racks 101 and whenever the handle starts forwardly this comb plate is vibrated from the cam plate 109 so as to reset all of the tripping pawls 141. This resetting operation consists in moving the racks 101 forwardly until the forward ends of the restraining dogs drop in position in their respective positions behind racks 101. The pawls 141 are reset when the racks 101 are tripped. The jumping forward of the tappet 146 places them in the paths of the movable racks 101 so that when said movable racks are released tappets 146 and their pins 145 are moved rearwardly, so that the pins 145 occupy their normal position in the higher step at the rear end of the tripping pawl 141, permitting the forward end of the tripping pawl to rise, and the rear end to be depressed, moving the cam face 144 out of engagement with the pin 149, releasing the restraining dog so that it may drop into operative position when the restoring comb 150 operates to restore the abnormal racks 101.

The carrying mechanism for the register wheels 268 is similar in operation to the carrying mechanism shown in application serially numbered 310,739 referred to, with the following difference: In lieu of a permanent rack segment, the carrying teeth which engage the register wheels are arranged on a horizontally movable bar 129$^c$, which is restrained from movement by a pawl 124$^b$. This pawl is controlled by a pendant 121$^a$ operated by tripping projections (not shown) on the register wheels 268. Whenever one of the pendants 121$^a$ is operated to release the pawl 124$^b$, the bar 129$^c$ jumps forwardly to a position where the pawls 124$^b$ will not enter their notches. At this time the register wheels 268 are in mesh with the racks 100 and of course out of mesh with the teeth on the bars 129°. When the register wheels 268 are disengaged from the racks 100 and thrown into mesh with the teeth on bars 129°, a restoring plate 137ᵃ which held the bars 129° against movement is vibrated to release the bars 129° and effect the carrying.

The plate 137ᵃ is operated by a link 138ᵃ having a tappet which coöperates with the cam plate 82. The operation of this cam plate 82 is such that when the handle moves forward the tappet is idly vibrated, leaving the restoring plate away from the bars 138ᵃ. As the handle moves rearwardly the tappet and bar 138ᵃ are lifted so as to move the restoring bar inwardly, restoring all of the bars 129°, the heel of the cam face at the rear end of plate 82 insuring the proper seating of the pawls 124ᵇ by imparting to the bars a slight excess movement. The restoring plate then drops away from the bars 138ᵃ a slight distance, so that if any of the pawls 124ᵇ are tripped when the adding wheels are being rotated they will release the bars 129° but said bars will be restrained from movement until the tappet drops into the recess at the forward edge of the cam plate. At this time the handle has disengaged the adding wheels from the racks, said adding wheels in such movement becoming engaged with the bars 129°. After such engagement the restoring bar is moved away from the bars 129° and carrying is effected. Thus at the end of each operation the adding wheels stand fully carried when the handle is in its home position, but the bars 129° are not restored until the handle starts on its rearward movement upon the succeeding operation thereof.

The cam for operating the link 138 may be in the form of a plate 82ᵃ secured to the forward edge of the cam plate 82, as shown in Fig. 3. This cam plate coöperates with a tappet on the link 138, which link 138 restores the displaced racks 101, as the handle starts forward.

Having thus described my invention what I claim is:

1. In a calculating machine, actuating devices, a series of wheels constituting an accumulator designed to be thrown into and out of engagement with said actuating devices, revoluble totalizers, and means for revolving said totalizers so as to place a selected one in coöperative relation to said actuators whereby the selected totalizer may be placed in or under control of said set of accumulator wheels.

2. In a calculating machine, actuating devices, a set of accumulator wheels in constant coöperative relation thereto, revoluble totalizers any one of which may be brought into coöperative relation to said actuators, and plural means for revolving said totalizers in different directions.

3. In a calculating machine, the combination of a set of actuating devices, accumulator wheels in constant relation thereto, revoluble totalizers, a traveling carriage, and means controlled by said carriage for positively revolving said totalizers in one direction to place a selected set of totalizers in coöperative relation to said actuators.

4. In a calculating machine, the combination of a set of actuating devices, accumulator wheels in constant relation thereto, revoluble totalizers, a traveling carriage, means controlled by said carriage for positively revolving said totalizers in one direction to place a selected set of totalizers in coöperative relation to said actuators, and yielding means for revolving said totalizers in the opposite direction.

5. In a calculating machine, actuating devices, a set of accumulator wheels in constant relation thereto, a set of revolving totalizers, yielding means tending to revolve said totalizers in one direction, an escapement mechanism for controlling said yielding means, and a traveling carriage for controlling said escapement mechanism whereby said revolving totalizers are positioned relative to said actuating devices.

6. In a calculating machine, a power shaft, actuating devices, a set of accumulator wheels in constant relation to said actuating devices, revoluble totalizers, means for revolving said totalizers whereby a selected one may be brought into relation to said actuating devices so as to be placed in or under control of said set of accumulator wheels, a swinging frame in which said revoluble totalizers are mounted, and means actuated by the power shaft of the machine for actuating said swinging frame.

7. In a calculating machine, actuating devices, a set of accumulator wheels in constant relation thereto, revoluble totalizers, means for positioning a selected one of said revoluble totalizers in relation to said actuating devices whereby it is placed in or under control of said set of accumulator wheels, and recording mechanism operated by said actuating devices for making a record of the position thereof when articulated with either or both sets of accumulator and totalizer wheels.

8. In a calculating machine, two totalizers, operating levers, racks having permanently fixed relation to said operating levers for actuating one totalizer, and racks having movable relation to said levers for operating the other totalizer, said racks being normally out of engagement with both sets of totalizers.

9. In a calculating machine, two totalizers, a series of levers for operating the same, a series of racks under the control of said levers and normally out of engagement with said totalizers, for actuating one of said totalizers, said racks having permanently fixed relation to said levers, and a series of movable racks under the control of said levers and having a movement independent of the latter and equal to the value of one tooth, for actuating the other of said totalizers.

10. In a calculating machine, two sets of totalizers, and actuating devices therefor and normally out of engagement therewith, said actuating devices having integral teeth at one end for coöperating with one set of totalizers, and movable teeth at its opposite end for coöperating with the other set of totalizers.

11. In a calculating machine, a totalizer whose wheels are provided with tripping projections, actuating racks normally out of engagement with said totalizer and having movement of one tooth independent of the means for driving them, driving means for said racks, tripping pawls actuated by the tripping projections of the adding wheels, pawls for holding said movable racks in normal position, and means operated by said tripping pawls for lifting said last mentioned pawls and permitting the racks to move to an abnormal position.

12. In a calculating machine, a totalizer whose wheels are provided with tripping projections, actuating racks normally out of engagement with said totalizer, driving means for said racks, said racks having a movement equal to the value of one tooth independent of said driving means, pawls for holding said racks in normal position against the impelling action of springs, tripping pawls actuated by the tripping projections of the totalizer wheels, means for holding said tripping pawls in an abnormal position after they are tripped whereby said tripping pawls will trip the restraining pawls, and means for restoring the parts to normal position.

13. In a calculating machine, a totalizer whose wheels are provided with tripping projections, actuating racks, driving means for said racks, said racks having a movement equal to the value of one tooth independent of said driving means, springs for holding said racks, restraining pawls for preventing the movement of said racks, tripping pawls operated by the tripping projection of the totalizer wheels, means for holding said tripping pawls in abnormal position whereby when said racks are restored a part of the tripping pawl will lie in the path of the restraining pawls so as to release the rack at the final movement thereof and drive the totalizer wheels in mesh therewith before said totalizer wheel is disengaged therefrom, the movement of the released rack restoring the tripping pawl to normal position, and means for restoring the released racks to normal position after the totalizer wheels have been disengaged therefrom.

In testimony whereof I hereunto affix my signature in the presence of two witnesses, this 27th day of September, 1907.

WILLIAM W. HOPKINS.

Witnesses:
 GEORGE BAKEWELL,
 LENORE WILSON.